US007889895B2

(12) United States Patent
Nowinski et al.

(10) Patent No.: US 7,889,895 B2
(45) Date of Patent: Feb. 15, 2011

(54) METHOD AND APPARATUS FOR IDENTIFYING PATHOLOGY IN BRAIN IMAGES

(75) Inventors: Wieslaw Lucjan Nowinski, Singapore (SG); Qingmao Hu, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 922 days.

(21) Appl. No.: 10/582,725

(22) PCT Filed: Dec. 12, 2003

(86) PCT No.: PCT/SG03/00284

§ 371 (c)(1),
(2), (4) Date: Jun. 7, 2007

(87) PCT Pub. No.: WO2005/057498

PCT Pub. Date: Jun. 23, 2005

(65) Prior Publication Data

US 2007/0280518 A1 Dec. 6, 2007

(51) Int. Cl.
*G06K 9/00* (2006.01)
*A61B 5/05* (2006.01)

(52) U.S. Cl. .................. 382/128; 382/172; 600/410

(58) Field of Classification Search .................. 382/100, 382/128, 129, 130, 131, 132, 133, 134, 154, 382/168, 172, 173, 181, 189, 219, 232, 254, 382/274, 276, 285–291, 305, 312, 170; 600/410; 1/1

See application file for complete search history.

(56) References Cited

U.S. PATENT DOCUMENTS 4,606,065 A * 8/1986 Beg et al. .................. 382/170

| 4,856,528 A * | 8/1989 | Yang et al. .................. 382/131 |
| 6,253,210 B1 * | 6/2001 | Smith et al. ........................ 1/1 |
| 6,430,430 B1 * | 8/2002 | Gosche ....................... 600/410 |
| 7,496,228 B2 * | 2/2009 | Landwehr et al. ........... 382/170 |

FOREIGN PATENT DOCUMENTS

JP 2001 092980 4/2001

(Continued)

OTHER PUBLICATIONS

Clark, Matthew C., et al. "Automatic Tumor Segmentation Using Knowledge-Based Techniques." IEEE Transactions on Medical Imaging, Apr. 1998, pp. 187-201, vol. 17, No. 2, ISSN: 0278-0062.
Fletcher-Heath, Lynn M., et al. "Automatic segmentation of non-enhancing brain tumors in magnetic resonance images." Elsevier, Artificial Intelligence in Medicine 21(1-3) (2001), pp. 43-63.
Hu, Qingmao, et al. "A rapid algorithm for robust and automatic extraction of the midsagittal plane of the human cerebrum from neuroimages based on local symmetry and outlier removal." NeuroImage, Dec. 2003, pp. 2153-2165, vol. 20, Issue 4.

(Continued)

*Primary Examiner*—Seyed Azarian
(74) *Attorney, Agent, or Firm*—Blakely, Sokoloff, Taylor & Zafman LLP

(57) ABSTRACT

A method and apparatus for identifying pathology in a brain image comprises the steps of firstly determining the location of the midsagittal plane (MSP) of the brain illustrated in the image under examination by identifying the symmetry of the two hemispheres based on the determination of up to 16 approximated fissure line segments (AFLSs). Those AFLSs with a larger angular deviation from the MSP than a predefined threshold are considered as outlier AFLSs while the rest are taken as inlier AFLSs. The ratio of the number of the outlier AFLSs to the number of inlier AFLSs is then calculated. A comparison of the ratio with a further predetermined threshold value is made and if the ratio exceeds the further predetermined threshold value, pathology is present in the brain image.

30 Claims, 2 Drawing Sheets

FOREIGN PATENT DOCUMENTS

| WO | WO 00/65985 | 11/2000 |
| WO | WO 02/43003 A1 | 5/2002 |
| WO | WO 03/060827 A1 | 7/2003 |
| WO | WO 2004/034178 A2 | 4/2004 |
| WO | WO 2004/077359 A1 | 9/2004 |

OTHER PUBLICATIONS

Kaus, Michael R., et al. "Automated Segmentation of MR Images of Brain Tumors." Radiology, Feb. 2001, pp. 586-591, vol. 218, No. 2.

Li, Chunlin, et al. "Knowledge-Based Classification and Tissue Labeling of MR Images of Human Brain." IEEE Transactions on Medical Imaging, Dec. 1993, pp. 740-749, vol. 12, No. 4.

Maier, Stephan E., et al. "Characterization of normal brain and brain tumor pathology by chisquares parameter maps of diffusion-weighted image data." European Journal of Radiology, 2003, pp. 199-207, vol. 45, Elsevier Science Ireland Ltd.

PCT International Search Report for PCT Application No. PCT/SG2003/000284, 4 pgs (Sep. 2, 2004).

PCT Notification of Transmittal of International Preliminary Examination Report for PCT Application No. PCT/SG2003/000284, 3 pgs. (Aug. 24, 2005).

Written Opinion of the International Search Authority for PCT Application No. PCT/SG2003/000284, 3 pgs (Jun. 3, 2005).

* cited by examiner

METHOD AND APPARATUS FOR IDENTIFYING PATHOLOGY IN BRAIN IMAGES

CROSS-REFERENCE TO OTHER APPLICATIONS

This is a National Phase of International Application No. PCT/SG2003/000284 filed on Dec. 12, 2003.

FIELD OF THE INVENTION

The present invention relates to a method and apparatus for identifying pathology in brain images, such as brain tumours in neurological images.

BACKGROUND OF THE INVENTION

Computer-assisted surgical planning and advanced image-guided technology are increasingly used in neurosurgery, as the availability of accurate anatomical 3-dimensional models improves considerably the spatial information concerning the relationships of important structures. In addition, the importance of computer-aided diagnosis in neuroradiology is growing. At the same time, brain databases are expanding rapidly and the technology to analyse these images efficiently, particularly for large databases, is progressing.

The identification of brain tumours has conventionally been achieved through segmentation using knowledge-based systems or an atlas, as set out in Kaus M R et al "Automated segmentation of MR images of brain tumours" Radiology 2001; 218(2): 586-591; Fletcher-Heath L M et al, "Automatic Segmentation of non-enhancing brain tumors in magnetic resonance image," Artificial Intelligence in Medicine 2001; 21(1-3): 43-63; and Clark M C et al, "Automatic tumor segmentation using knowledge-based technique" IEEE Transactions on Medical Imaging 1998; 17(2): 187-201.

U.S. Pat. No. 4,856,528 discloses a computer-implemented arrangement for semi-automatically determining the volume of a tumour from CT image data. A histogram indicative of the number of pixels within the organ outline of respective slices is produced. The distinction between the tumour tissue and normal organ tissue is determined enabling determination of the volume of the tumour.

WO 02/43003 discloses a system for analysing a brain image. The brain image is compared with a brain atlas and the image is labelled accordingly, and annotated with regions of interest and/or other structures.

Eur J Radiol 2003 March; 45(3):199-207 entitled "Characterization of normal brain and brain tumor pathology by chisquares parameter maps of diffusion-weighted image data" Maier S E, Mamata H, Mulkern R V, Dept. of Radiology (MRI), Brigham and Women's Hospital, Harvard Medical School, 75 Francis Street, 02115 Boston Mass., USA discloses the test results of a characterisation of normal and pathologic brain tissue by quantifying the deviation of a diffusion-related signal from a monoexponential decay when measured over a range of b-factors.

The present invention is directed to identifying pathology in medical images and automated scan interpretation. This is critical when searching large brain databases and the present invention aims to provide a method for fast identification of pathology in images. The method is particularly advantageous in situations where there is a need to identify the presence of pathology before model-based approaches may be applied. The pathology may then be localised and segmented prior to the application of such model-based approaches.

SUMMARY OF THE INVENTION

According to a first aspect of the present invention there is provided a method for identifying pathology in a brain image comprising the steps of:

(a) determining the location of the midsagittal plane (MSP) by calculating up to 16 approximated fissure line segments (AFLSs) and removing outlier AFLSs, the outlier AFLSs having a larger angular deviation from the MSP than a predefined threshold;

(b) calculating the ratio of the number of outlier AFLSs to the number of inlier AFLSs, the inlier AFLSs having a smaller angular deviation from the MSP than the predefined threshold; and (c) comparing the ratio with a further predetermined threshold value, the ratio exceeding the further predetermined threshold value when pathology is present in the brain image.

Preferably, the image comprises image data and the method further comprises the step of:

(d) reformatting the image data to align the image with the MSP.

Preferably, the reformatting is performed using vector manipulation, and the midsagittal plane has an equation $x'+d'=0$ where $x'$ is a co-ordinate in the O'X' direction and $d'$ is a constant, the image having an original co-ordinate system OXYZ before reformatting and a reformatted co-ordinate system after reformatting comprising co-ordinates O'X', O'Y' and O'Z', the step of reformatting comprising:

(i) starting with an MSP equation:

$$ax+by+cz+d=0,$$

where $d$ is less than 0 and $(a, b, c)$ is the unit normal vector of the MSP;

(ii) determining two points that are the intersections between the MSP and the volume of the brain shown in the image under examination, denoting the two points as A $(x_A, y_A, 0)$ and B $(x_B, y_B, 0)$, both of the two points being on the MSP;

(iii) when $a$ is not equal to 0, calculating A and B as follows:

$$x_A=-d/a, y_A=0$$

$$x_B=-(d+b(y\text{Size}-1))/a, y_B=y\text{Size}-1$$

where ySize is the number of voxels in the Y direction of the original volume;

(iv) when $a$ is 0, $b$ should not be 0, and calculating A and B as follows:

$$x_A=0, y_A=-d/b$$

$$x_B=x\text{Size}-1, y_B=-(d+a(x\text{Size}-1))/b$$

where xSize is the number of voxels in the X direction of the original volume; and (v) changing the original coordinate system OXYZ to the reformatted co-ordinate system O' X' Y'Z', the unit vectors of the co-ordinates O'X', O'Y' and O'Z' being calculated in the following manner:

$$O'X=(a,b,c)=(n_{x1},n_{y1},n_{z1})$$

$$O'Y=((x_A-x_B)/\downarrow A-B\downarrow,(y_A-y_B)/\downarrow A-B\downarrow,0)=(n_{x2},n_{y2},n_{z2})$$

$$O'Z'=O'X\times O'Y=(n_{x3},n_{y3},n_{z3})$$

where $\downarrow A-B\downarrow$ is the Euclidean distance between points A and B, the transformation between OXYZ and O'X'Y'Z' being defined as follows:

$X' = n_{x1}X + n_{y1}Y + n_{z1}Z$ $Y' = n_{x2}X + n_{y2}Y + n_{z2}Z$ $Z' = n_{x3}X + n_{y3}Y + n_{z3}Z$ $O' = 0$.

In a preferred embodiment, the method further comprises the step of processing one or more slices through the image to determine interhemispheric symmetry.

Preferably, the step of processing comprises processing one or more slices having a plane substantially perpendicular to the midsagittal plane.

Preferably, the step of processing comprises processing one more slices having a plane which intersects the midsagittal plane.

Preferably, the image comprises data representing the brain and background image data, the step of processing comprising extracting the background image data and retaining the data representing the brain.

Preferably, the image is comprised of a number of pixels, the step of extracting comprising calculating a histogram of grey level of the image along a first axis, for example the x-axis, against the number of pixels of the image along a second axis, for example the y-axis, locating a first peak in the histogram formed at the intersection of a positive slope and a negative slope, extrapolating the approximating the positive slope back to intersect the first axis and taking the value of grey level at the intersection of the positive slope with the first axis as a threshold grey level value.

In a preferred embodiment, the step of processing comprises further processing the image to obtain a binary image by setting the pixels having a grey level greater than the threshold grey level to 1 and the pixels having a grey level lower than the threshold grey value to 0.

Preferably, the image depicts the brain and a skull, the method further comprising the steps of opening the binary image with a structuring element of pixels and expanding the structuring element to fill the image of the skull to produce a head mask.

Preferably, the method further comprises cropping the image to the head mask to remove the background data visible in the image.

Preferably, the method further comprises calculating a histogram of grey level of the image along a first axis against the number of pixels of the image along a second axis for each hemisphere, smoothing the histogram for each hemisphere, comparing the histograms of the two hemispheres by calculating the difference between the histograms.

Preferably, the step of calculating the difference in values between the histograms comprises calculating a difference function between the values of the histograms for all grey levels. Preferably, the difference function has a maximum value and a minimum value, the method further comprising identifying when the difference between the maximum value and the minimum value exceeds a threshold difference value to indicate pathology presence in the brain under examination.

There are more ways to calculate this difference in values between the histograms, for example, from the:
- absolute difference between the histograms
- difference of their areas
- normalized difference of their areas (e.g., by half of their sum)

In addition, before calculating the histogram difference, the histograms may be aligned horizontally, for instance, by maximizing their cross-correlation.

In a preferred embodiment, the method further comprises determining the extent of pathology in the brain under examination. Preferably, the step of determining extent of pathology comprises determining the ratio of the number of slices with pathology to the total number of slices studied.

Preferably, the method further comprises determining the location of the pathology. Preferably, the step of determining the location of the pathology comprises locating the hemisphere that contains pathology. Preferably, the step of locating comprises determining the modality of histograms for both hemispheres of the brain under consideration, tri-modality existing for both hemispheres being an indication of a small pathology existing in one or both hemispheres.

In a preferred embodiment the method comprises determining if one or both of the hemispheres is not tri-modal indicating pathology existence therein and, if one or both of the hemispheres is not tri-modal determining the modality of the histograms for each slice. Preferably, the method further comprises determining if tri-modality exists for all of the slices within both hemispheres, and if it does not exist determining if the ratio of the number of the outlier AFLSs to the number of the inlier AFLSs, is greater than the further threshold value to indicate existence of pathology which is crossing the interhemispheric fissure.

If tri-modality exists for all of the slices within both hemispheres, and if it does not exist, the method preferably further comprises determining if the ratio of the number of the outlier AFLSs to the number of inlier AFLSs is less than the further threshold value to indicate existence of pathology in both hemispheres.

According to a second aspect of the present invention there is provided an apparatus arranged to perform the method for identifying pathology in a brain image defined above.

According to a third aspect of the invention there is provided a computer program product comprising computer program instructions readable by a computer apparatus to cause the computer apparatus to perform the method defined above.

The present invention provides a method for fast identification of pathology such as brain tumours in neuro images. Preferred embodiments of the method test two features, linearity of the interhemispheric fissure and image symmetry for both hemispheres.

BRIEF DESCRIPTION OF THE DRAWINGS

The present invention will be described by way of example and with reference to the accompanying figures in which.

DESCRIPTION OF PREFERRED EMBODIMENTS

An embodiment of the present invention provides a fast, automatic, accurate and robust method for extracting pathology of, for example, a human or animal brain, from three-dimensional radiological images such as CT or MRI images. The steps constituting a preferred embodiment of the method are shown in the flow diagram of FIG. 1. The method of the present invention will be discussed in more detail after a brief discussion of these steps.

Figure 1:
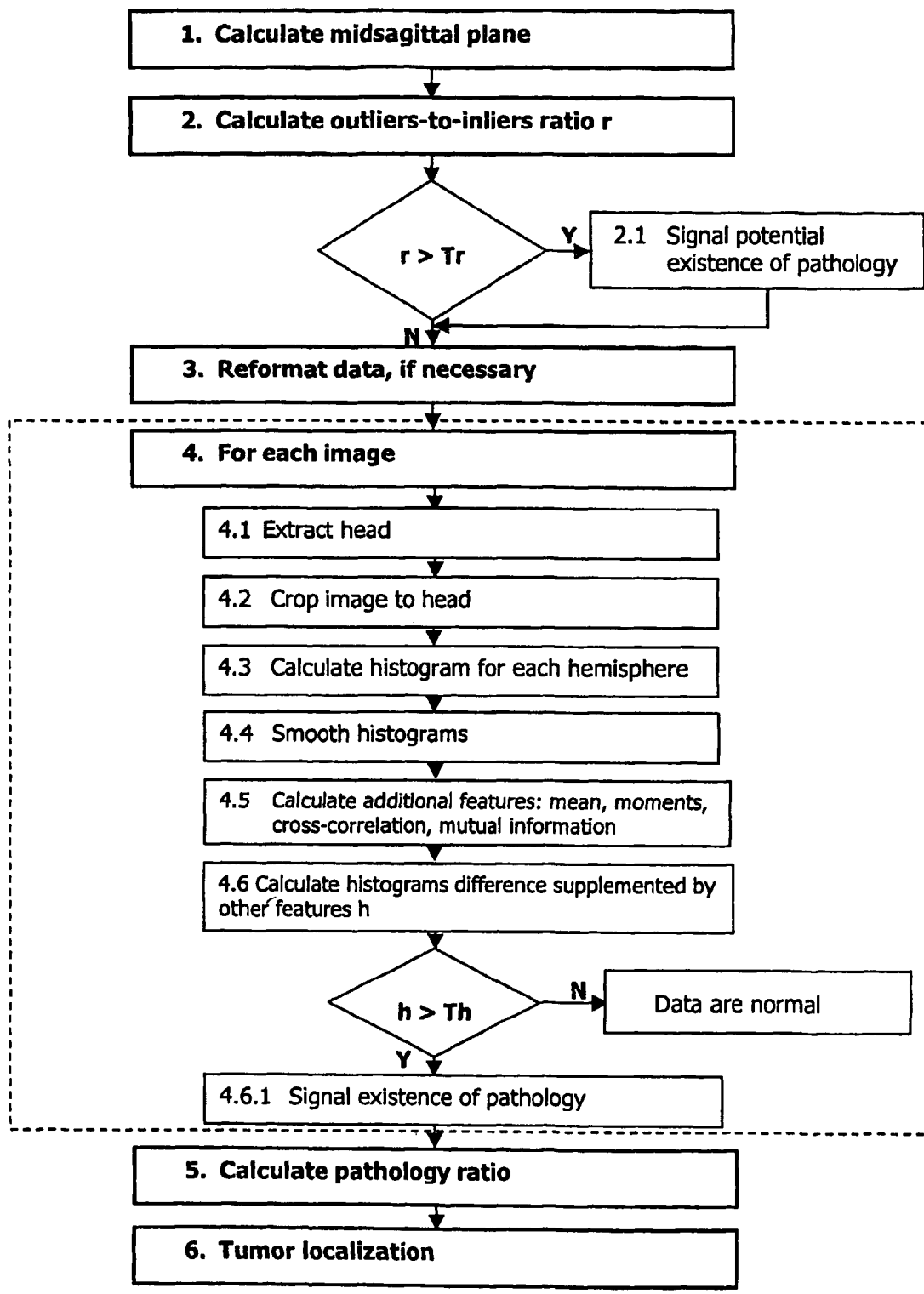
FIG. 1 is a flow diagram showing the six steps in an embodiment of a method according to the invention for identifying tumours in a brain being examined.

The processing steps, illustrated in the flow diagram of FIG. 1 are as follows:

1. The first step is to calculate the midsagittal plane (MSP), for example, using the methods described in the patent applications PCT/SG02/00006 and PCT/SG02/00231 both by Hu and Nowinski.

2. The second step is to calculate the ratio of the number of outlier AFLSs to the number of inlier AFLSs to signal a potential existence of pathology when the outliers-to-inliers ratio is above a certain threshold.

3. The third step is to reformat, if necessary, the original slices to be perpendicular to the MSP.

4. The fourth step is, for each image, to:

(a) extract the head from the image;

(b) crop the image to contain the head only and set the background to zero;

(c) calculate a histogram for each hemisphere;

(d) smooth the calculated histograms;

(e) calculate additional features of the hemispheres, such as intensity mean, moments, cross-correlation, and mutual information;

(f) compare the histograms for the two hemispheres, preferably with additional features and if their difference is larger than a certain threshold, signal the existence of pathology;

5. The fifth step is to calculate the pathology ratio.

6. The sixth step is to locate pathology.

Figure 2:
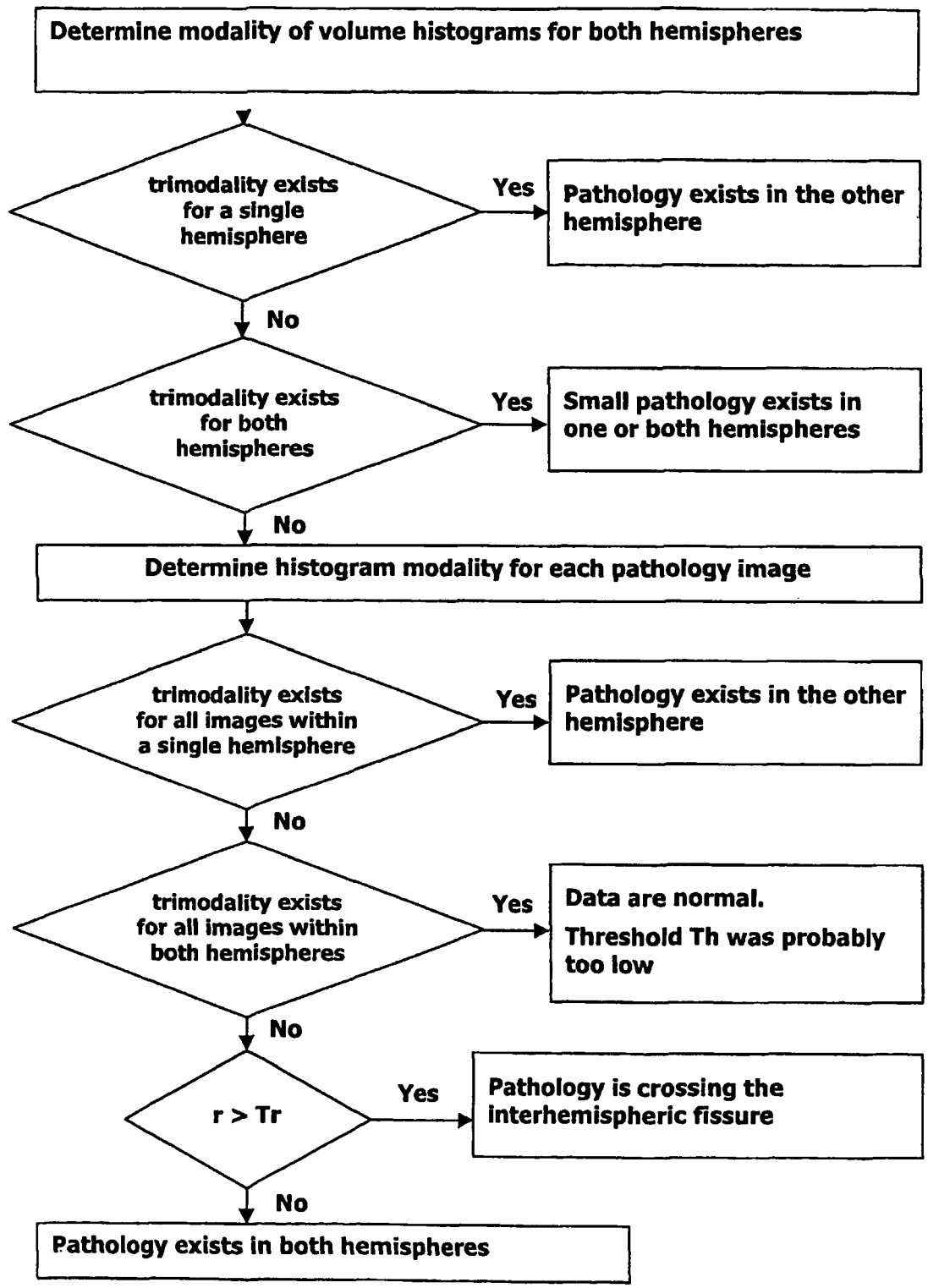
FIG. 2 is a flow diagram showing the procedure involved in the sixth step illustrated in FIG. 1 for locating a tumour.

FIG. 2 shows a flow diagram of the stages involved in the sixth step of FIG. 1 for determining whether or not pathology exists in both hemispheres or lobes of a brain being examined.

The algorithm illustrated in FIG. 1 has six major steps which are set out below:

Step 1: Calculate the Midsagittal Plane (MSP)

The midsagittal plane (MSP) is calculated using the algorithm described in the applicant's co-pending International patent application number PCT/SG02/00006 filed on 18 Jan. 2002 and entitled "Methods and apparatus for determining symmetry in 2D and 3D images" which describes methods for determining the MSP of human brains from radiological images. The algorithm described in International patent application number PCT/SG02/00006, the content of which is incorporated herein by reference, provides a rapid, accurate, and automatic calculation of the MSP and enables determination of the equation of the MSP which divides the brain image data into two hemispheres. By this method, the up to 16 approximated fissure line segments (AFLSs) are extracted and used to calculate the MSP. These AFLSs are then compared with the calculated MSP to find outlier and inlier AFLSs. Those AFLSs with an angular deviation from the MSP bigger than a predefined threshold are considered outlier AFLSs, while the rest are taken as inlier AFLSs.

Step 2: Calculate the Outliers-to-Inliers Ratio (r)

The ratio (r) of the number of outliers to the number of inliers is calculated. The existence of outliers means that some of the interhemispheric fissure line segments may be far from one common interhemispheric fissure plane. There are two major reasons for this, namely, an intrinsic curvature of the (normal) brain and/or a pathology process that distorts the interhemispheric fissure. To measure this distortion, the outliers-to-inliers ratio (r) is introduced and applied in step 2.1, as follows.

Step 2.1: Compare the Outlier-to-Inliers Ratio with a Given Threshold

When r=0, there are no outliers and the interhemispheric fissure forms almost an ideal plane. On the other hand, if r=1 this means that the number of outliers equals the number of inliers and therefore the interhemispheric fissure is curved or distorted. A suitable threshold (Tr) is set experimentally between 0 and 1. When r is greater than Tr, the method signals a potential existence of pathology. The processing of the images continues to check the symmetry of the images. This MSP linearity condition is also used in step 6 when localising pathology which is described below.

Step 3: Reformat Data

The anatomy of a normal brain is approximately symmetrical with respect to the interhemispheric fissure. To test the symmetry, images have to be available in a plane perpendicular to the MSP. If the originally acquired data are not perpendicular to the MSP, the data have to be reformatted. Either axial or coronal sections may be generated (or taken if they exist) for further processing. The reformation of data may be carried out in the following way so that the reformatted volume of the brain under consideration will have an MSP equation $x'+d'=0$.

If the original MSP equation is $$ax+by+cz+d=0,$$

where d is less than 0 and (a, b, c) is the unit normal vector of the MSP, then the following steps are performed.

a) Find two points that are the intersections between the MSP and the original volume, then denote these two points as A $(x_A, y_A, 0)$ and B $(x_B, y_B, 0)$. Both of these two points are on the MSP.

When a is not equal to 0, A and B may be calculated as follows, $$x_A=-d/a, y_A=0$$

$$x_B=-(d+b(y\text{Size}-1))/a, y_B=y\text{Size}-1$$

where ySize is the number of voxels in the Y direction of the original volume.

When a is 0, b should not be 0, A and B can be determined in a similar way:

$$x_A=0, y_A=-d/b$$

$$x_B=x\text{Size}-1, y_B=-(d+a(x\text{Size}-1))/b$$

Where xSize is the number of voxels in the X direction of the original volume.

b) If the original coordinate system OXYZ is changed to O'X'Y'Z', the unit vectors of O'X', O'Y' and O'Z' are calculated in the following manner:

$$O'X'=(a,b,c)=(n_{x1},n_{y1},n_{z1})$$

$$O'Y'=((x_A-x_B)/\downarrow A-B\downarrow,(y_A-y_B)/\downarrow A-B\downarrow,0)=(n_{x2},n_{y2},n_{z2})$$

$$O'Z'=O'X'\times O'Y'=(n_{x3},n_{y3},n_{z3})$$

where $\downarrow A-B\downarrow$ the Euclidean distance between points A and B.

c) The transformation between OXYZ and O'X'Y'Z' is thus defined as follows:

$$X'=n_{x1}X+n_{y1}Y+n_{z1}Z$$

$$Y'=n_{x2}X+n_{y2}Y+n_{z2}Z$$

$$Z'=n_{x3}X+n_{y3}Y+n_{z3}Z$$

$$O'=0$$

Step 4: Process Images

The individual axial or coronal images are processed to determine interhemispheric symmetry. Processing individual images increases robustness in comparison to processing the entire hemispheres.

Step 4.1: Extract Head

Firstly the head is extracted from the image. The background image area (outside the head) is set to zero. The head may be extracted through thresholding and morphological processing, for example, as described in the applicant's co-pending International patent application number PCT/SG03/00043 filed on 27 Feb. 2003 and entitled "Method and apparatus for extracting the human cerebral ventricular system from images", the content of which is incorporated herein by reference. The histogram of the image is calculated and the first peak of the histogram is located. The use of a triangle to approximate the histogram shape around the peak of the histogram may produce the bottom of the peak and that value is taken as the threshold. However, a Gaussian or other appropriate method may be used instead of a triangle for this purpose. Thresholding the image to produce a binary image may be achieved by setting all pixels with a grey level greater than the threshold to 1 and the rest to 0.

The morphological processing applied to the binary image after thresholding comprises opening the binary image with a square structuring element of, for example, four pixel sizes, to fill small broken skull. The largest component of the binary image is located and the holes within this image are filled to obtain the head or head mask.

Step 4.2: Crop the Image to the Head

The image is cropped to the head from all four directions. This is to eliminate, firstly, a potential influence of the background on the histogram comparison due to, for example, the non-central location of the head within the image, and secondly, to speed up the generation of the histograms by decreasing the number of pixels processed.

Step 4.3: Calculate Histogram for each Hemisphere

For each left and right hemisphere its histogram is calculated.

Step 4.4: Histogram Smoothing

A histogram may contain a number of spikes due to noise. Prior to histogram comparison, a histogram smoothing operation is applied by using, for example, a procedure employed in the ventricular system extraction algorithm described in the applicant's co-pending International patent application number PCT/SG03/00043 filed on 27 Feb. 2003 and entitled "Method and apparatus for extracting the human cerebral ventricular system from images", the content of which is incorporated herein by reference.

Step 4.5: Histogram Comparison

It has been appreciated by the applicant that symmetric hemispheres should have similar histograms and comparing histograms is a more efficient way of matching hemispheres than comparing the images pixel by pixel.

A fast histogram comparison is achieved by calculating the difference between the histograms being compared. The difference between histograms is computed by calculating a difference function between their values for all grey levels. The minimum and maximum of this function is determined. When the difference between the maximum and minimum is beyond a given threshold Th (which may be determined experimentally for normal brains), this image is marked as pathological and the method signals the existence of pathology. The histogram comparison is not sensitive to a vertical shift between histograms.

There are more ways to calculate this difference in values between the histograms, for example, from the:
- absolute difference between the histograms
- difference of their areas
- normalized difference of their areas (e.g., by half of their sum)

In addition, before calculating the histogram difference, the histograms may be aligned horizontally, for instance, by maximizing their cross-correlation.

A more sophisticated comparison of histograms may involve fitting multiple Gaussians into these histograms and comparing their mean values and standard deviations. An example of such a technique is described in the applicant's co-pending International patent application number PCT/SG03/00043 filed on 27 Feb. 2003 and entitled "Method and apparatus for extracting the human cerebral ventricular system from images", the content of which is incorporated herein by reference.

Prior to histogram comparison, the image may be corrected for non-homogeneity, if necessary.

Step 5: Calculate Pathology Ratio

The pathology ratio is calculated as being the ratio of the number of slices containing pathology to the total number of slices studied. This ratio gives an extent of pathology within the data.

Step 6: Pathology Location

After identifying pathology, an embodiment of the method according to the present invention provides additional information about the location of pathology. The first step is to locate the hemisphere that contains pathology. The histogram for a normal brain anatomy has three distinctive peaks, one peak for cerebrospinal fluid, one for grey matter, and one for white matter (the background set to zero is not considered). This is termed 'tri-modality'. A hemisphere with pathology may not fit to this model, and may have, for example, an additional peak.

The sub-steps for determining the location of pathology are illustrated in the flow diagram of FIG. 2. The first sub-step is to determine the modality of volume histograms for both hemispheres of the brain under consideration.

If tri-modality exists for both hemispheres, then a small pathology exists in one or both hemispheres. If one or both of the hemispheres is determined not to be tri-modal, then pathology exists therein and the modality of the histograms for each slice showing pathology is determined.

If tri-modality exists for all slices within both hemispheres the data are normal and it may be assumed that the threshold Th (determined in step 4.5) was probably too low. If tri-modality does not exist for all of the slices within both hemispheres, and the outlier-to-inlier ratio r is greater than the threshold Tr (determined in step 2), then pathology exists which is crossing the interhemispheric fissure. If tri-modality does not exist for all of the slices within both hemispheres, and the outlier-to-inlier ratio r is less than the threshold Tr (determined in step 2), then pathology exists in both hemispheres.

The next step is to locate a pair of lobes containing pathology. Sub-steps 4.1 to 4.5 described above are then repeated for each pair of all lobes as opposed to the complete head. Repeating operations from FIG. 2 for a pair of lobes enables selecting the lobe or lobes with pathology.

The method of the invention may be supplemented with other features used instead of or together with the histograms.

The other features may include mean intensity value, cross-correlation, moments, and mutual information calculated for both hemispheres. This enables the comparison between both hemispheres to be performed using any of these features and it need not be limited only to the histograms and various ways of calculating their difference.

The method according to an embodiment of the invention is able to identify pathology in brain images and localise this pathology with respect to hemispheres and lobes. The method is fully automatic and very fast and enables screening of a large number of brain images for pathology, in particular brain tumours.

The method has applications in a number of fields including, for example, neurosurgery and neuroradiology.

The invention claimed is:

1. A method for identifying pathology in a brain image comprising:
   (a) determining by a processing device the location of the midsagittal plane (MSP) by calculating up to 16 approximated fissure line segments (AFLSs) and removing outlier AFLSs, the outlier AFLSs having a larger angular deviation from the MSP than a predefined threshold;
   (b) calculating by the processing device the ratio of the number of outlier AFLSs to the number of inlier AFLSs, the inlier AFLSs having a smaller angular deviation from the MSP than the predefined threshold; and
   (c) comparing by the processing device the ratio with a further predetermined threshold value, the ratio exceeding the further predetermined threshold value when pathology is present in the brain image.

2. A method as claimed in claim 1, wherein the image comprises image data and the method further comprises:
   reformatting the image data to align the image with the midsagittal plane.

3. A method as claimed in claim 2, wherein the reformatting is performed using vector manipulation.

4. A method as claimed in claim 2, wherein the midsagittal plane has an equation $x'+d'=0$ where $x'$ is a co-ordinate in the O'X' direction and $d'$ is a constant, the image having an original co-ordinate system OXYZ before reformatting and a reformatted co-ordinate system after reformatting comprising co-ordinates O'X', O'Y' and O'Z', the reformatting comprising:
   (i) starting with an MSP equation:

$$ax+by+cz+d=0,$$

where d is less than 0 and (a,b,c) is the unit normal vector of the MSP;
   (ii) determining two points that are the intersections between the MSP and the volume of the brain shown in the image under examination, denoting the two points as A $(x_A, y_A, 0)$ and B $(x_B, y_B, 0)$, both of the two points being on the MSP;
   (iii) when a is not equal to 0, calculating A and B as follows:

$$x_A=-d/a, y_A=0$$

$$x_B=-(d+b(y\text{Size}-1))/a, y_B=y\text{Size}-1$$

where ySize is the number of voxels in the Y direction of the original volume;
   (iv) when a is 0, b should not be 0, and calculating A and B as follows:

$$x_A=0, y_A=-d/b$$

$$x_B=x\text{Size}-1, y_B=-(d+a(x\text{Size}-1))/b$$

where xSize is the number of voxels in the X direction of the original volume; and
   (v) changing the original coordinate system OXYZ to the reformatted co-ordinate system O'X'Y'Z', the unit vectors of the co-ordinates O'X', O'Y' and O'Z' being calculated in the following manner:

$$O'X'=(a,b,c)=(n_{x1},n_{y1},n_{z1})$$

$$O'Y'=((x_A-x_B)/|A-B|,(y_A-y_B)/|A-B|,0)=(n_{x2},n_{y2},n_{z2})$$

$$O'Z'=O'X'xO'Y'=(n_{x3},n_{y3},n_{z3})$$

where |A−B| the Euclidean distance between points A and B, the transformation between OXYZ and O'X'Y'Z' being defined as follows:

$$X'=n_{x1}X+n_{y1}Y+n_{z1}Z$$

$$Y'=n_{x2}X+n_{y2}Y+n_{z2}Z$$

$$Z'=n_{x3}X+n_{y3}Y+n_{z3}Z$$

$$O'=0.$$

5. A method according to claim 1 further comprising: processing one or more slices through the image to determine interhemispheric symmetry.

6. A method according to claim 5, wherein the processing comprises processing one or more slices having a plane substantially perpendicular to the midsagittal plane.

7. A method according to claim 6, further comprising determining extent of pathology in the brain under examination.

8. A method according to claim 7 wherein the determining extent of pathology comprises determining the ratio of the number of slices with pathology to the total number of slices studied.

9. A method according to claim 7, further comprising determining the location of the pathology.

10. A method according to claim 9, wherein the determining the location of the pathology comprises locating the hemisphere that contains pathology.

11. A method according to claim 10, wherein the locating comprises determining the modality of histograms for both hemispheres of the brain under consideration, tri-modality existing for both hemispheres being an indication of a small pathology existing in one or both hemispheres.

12. A method according to claim 11, comprising determining if one or both of the hemispheres is not tri-modal indicating pathology existence therein and, if one or both of the hemispheres is not tri-modal determining the modality of the histograms for each slice.

13. A method according to claim 12, further comprising determining if tri-modality exists for all of the slices within both hemispheres, and if it does not exist determining if the ratio of the number of outlier AFLSs to the number of inlier AFLSs is greater than the further threshold value to indicate existence of pathology which is crossing the interhemispheric fissure.

14. A method according to claim 12, further comprising determining if tri-modality exists for all of the slices within both hemispheres, and if it does not exist, determining if the ratio of the number of outlier AFLSs to the number of inlier AFLSs is less than the further threshold value to indicate existence of pathology in both hemispheres.

15. A method according to claim 5 wherein the processing comprises processing one or more slices having a plane which intersects the midsagittal plane.

16. A method according to claim 5 wherein the image comprises data representing the brain and background image data, the processing comprising extracting the background image data and retaining the data representing the brain.

17. A method according to claim 16, wherein the image is comprised of a number of pixels, the extracting comprising calculating a histogram of grey level of the image along a first axis against the number of pixels of the image along a second axis, locating a first peak in the histogram formed at the intersection of a positive slope and a negative slope, extrapolating the approximating the positive slope back to intersect the first axis and taking the value of grey level at the intersection of the positive slope with the first axis as a threshold grey level value.

18. A method according to claim 17, wherein the processing comprises further processing the image to obtain a binary image by setting the pixels having a grey level greater than the threshold grey level to 1 and the pixels having a grey level lower than the threshold grey value to 0.

19. A method according to claim 18, wherein the image depicts the brain and a skull, the method further comprising opening the binary image with a structuring element of pixels and expanding the structuring element to fill the image of the skull to produce a head mask.

20. A method according to claim 19, further comprising cropping the image to the head mask to remove the background data visible in the image.

21. A method according to claim 20, further comprising calculating a histogram of grey level of the image along a first axis against the number of pixels of the image along a second axis for each hemisphere, smoothing the histogram for each hemisphere, comparing the histograms of the two hemispheres by calculating the difference between the histograms.

22. A method according to claim 21, wherein the calculating the difference in values between the histograms comprises calculating a difference function between the values of the histograms for all grey levels.

23. A method according to claim 21, wherein the difference function has a maximum value and a minimum value, the method further comprising identifying when the difference between the maximum value and the minimum value exceeds a threshold difference value to indicate pathology presence in the brain under examination.

24. A method according to claim 21, wherein the comparing the histograms comprises calculating the difference in area of the histograms, or the normalized difference in area of the histograms.

25. A method according to claim 21, further comprising aligning the histograms along an axis before comparing the histograms.

26. A method according to claim 25, wherein the aligning the histograms comprises maximising the cross-correlation of the histograms.

27. A method according to claim 1, further comprising calculating one or more additional features of each hemisphere, comparing the one or more additional features, and if their difference is larger than a predetermined threshold, signalling the existence of pathology.

28. A method according to claim 27, wherein the calculating one or more features comprises calculating one or more of intensity mean, moments, cross-correlation, and mutual information.

29. An apparatus arranged to perform a method for identifying pathology in a brain image according to claim 1.

30. A computer readable tangible storage medium including instructions that, when executed by a computer system, cause the computing system to perform a method comprising:
  (a) determining by a processing device the location of the midsagittal plane (MSP) by calculating up to 16 approximated fissure line segments (AFLSs) and removing outlier AFLSs, the outlier AFLSs having a larger angular deviation from the MSP than a predefined threshold;
  (b) calculating by the processing device the ratio of the number of outlier AFLSs to the number of inlier AFLSs, the inlier AFLSs having a smaller angular deviation from the MSP than the predefined threshold; and
  (c) comparing by the processing device the ratio with a further predetermined threshold value, the ratio exceeding the further predetermined threshold value when pathology is present in the brain image.

* * * * *